(12) United States Patent  
Patel

(10) Patent No.: US 8,740,250 B1  
(45) Date of Patent: Jun. 3, 2014

(54) FLEXIBLE SEAT BELT ADJUSTER

(71) Applicant: Mayuri Patel, West Chester, OH (US)

(72) Inventor: Paresh Patel, West Chester, OH (US)

( * ) Notice: Subject to any disclaimer, the term of this patent is extended or adjusted under 35 U.S.C. 154(b) by 0 days.

(21) Appl. No.: 13/858,071

(22) Filed: Apr. 7, 2013

(51) Int. Cl.
*B60R 22/00* (2006.01)

(52) U.S. Cl.
USPC ........................................ 280/801.1; 297/468

(58) Field of Classification Search
USPC .................. 280/801.1, 808; 297/468, 483
See application file for complete search history.

(56) References Cited

U.S. PATENT DOCUMENTS

| | | | |
|---|---|---|---|
| 3,806,999 A * | 4/1974 | Fieni ................................ | 24/637 |
| 4,367,570 A * | 1/1983 | Barbal ............................. | 24/602 |
| 5,188,425 A * | 2/1993 | Foster et al. .................. | 297/473 |
| 6,416,129 B1 * | 7/2002 | Hirota ............................ | 297/253 |
| 7,878,547 B2 * | 2/2011 | Dusina et al. .............. | 280/801.1 |
| 2007/0222272 A1 * | 9/2007 | Taylor ........................... | 297/468 |

* cited by examiner

*Primary Examiner* — Faye M. Fleming  
(74) *Attorney, Agent, or Firm* — Ken K. Patel

(57) ABSTRACT

A seat-belt adjusting apparatus mounted on the seat below the head rest of a vehicle's seat which catches a seat-belt buckle such that it sits closer to the passenger's shoulder when disengaged. The adjuster has two parallel rods connected by a seat-belt buckle guard for catching a seat-belt buckle and two adjustable plates each having two parallel, hollow, cylindrical-shaped sides through which the parallel rods can be inserted such that the plates can freely slide between the ends of the rods and the seat-belt buckle guard. Each plate includes an aperture through which a pin from a head rest can be inserted such that the seat belt adjuster can rest on a vehicle seat and receive a seat belt having a seat belt buckle.

10 Claims, 3 Drawing Sheets

FLEXIBLE SEAT BELT ADJUSTER

BACKGROUND AND FIELD OF THE INVENTION

Virtually every vehicle capable of moving at reasonable speeds has seat belts for driver and passenger safety. The National Highway Traffic Safety Administration estimates that seat belt use in passenger motor vehicles saves over 10,000 lives in the United States annually. Since the 1960s, individual states have passed legislation requiring the use of seat belts in passenger motor vehicles. To enhance the effectiveness and convenience of seat belts, many advancements in their designs and mechanisms have been made in the past. However, the need remains for a device to make seat belt access easier in certain cars and trucks. This class of vehicles predominately consists of two-door sedans, whose seat belts are mounted far behind the front passenger seats. This placement of seat belts renders it necessary to reach far behind ones head to access the seat belt. Numerous devices exist to mitigate this problem; however, all existing devices are tailor fitted for a particular vehicle. A device which could be used interchangeably between any car or truck would be desirable.

SUMMARY OF THE INVENTION

The present invention meets the aforementioned need in the art by providing a seat belt adjuster that mounts on the head rest of a vehicle to catch the seat belt buckle such that it sits closer to the passenger's shoulder. The present invention makes seat belt use more convenience by reducing the distance a passenger needs to reach to seat belt buckle, especially in two-door vehicles. Importantly, the seat belt adjuster of the present invention is flexible or adjustable such that it can mount on almost any motor vehicle's seat below a headrest. Specifically, the seat belt adjuster comprises of two parallel rods each having two ends whereby the rods are connected at the first ends by a seat belt buckle guard for catching a seat belt buckle. The flexible seat belt adjuster also includes two plates, each having at least two, parallel, hollow, cylindrical-shaped sides through which the parallel rods can be inserted such that the plates can slide freely between the ends of the rods. The plates further include apertures through which pins from a head rest can be inserted such that the seat belt adjuster can rest on a vehicle seat and receive a seat belt having a seat belt buckle.

DETAILED DESCRIPTION OF THE EMBODIMENTS

Figure 1:
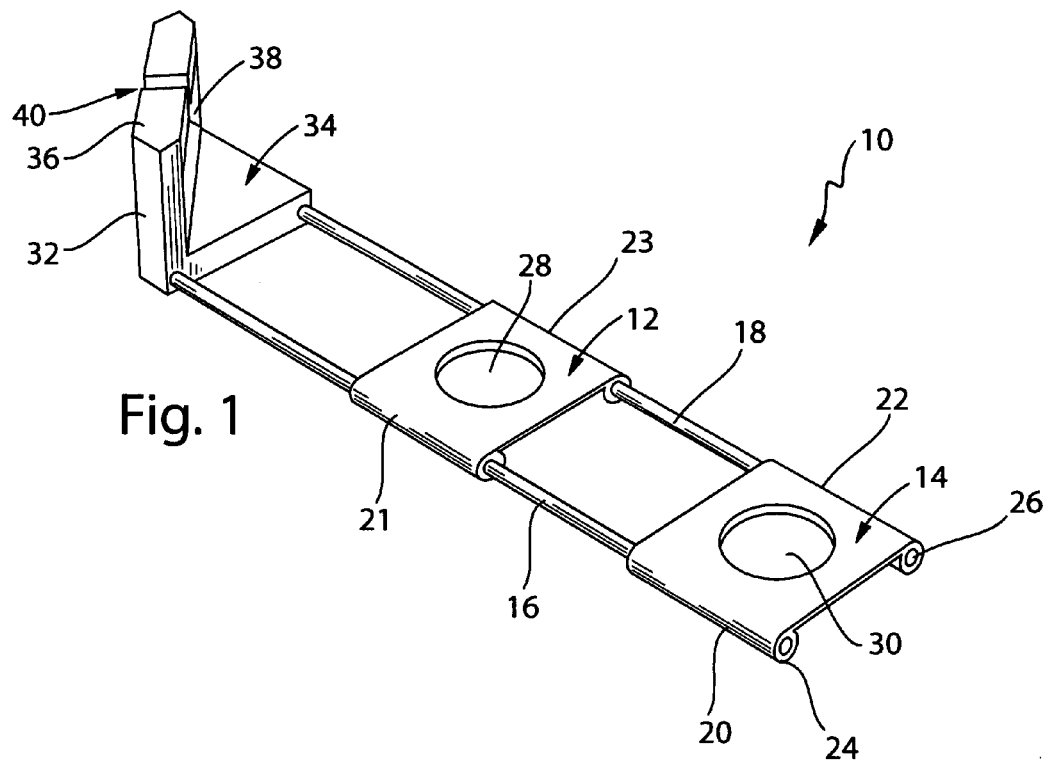
FIG. 1 is a top perspective view of the flexible seat belt adjuster in accordance with the invention.

Referring now to FIG. 1, the flexible seat belt adjuster 10 is shown having plates 12 and 14 moveably mounted on rods 16 and 18. The plates 12 and 14 have cylindrical-shaped sides 20 and 22 with holes 24 and 26 for receiving rods 16 and 18 so that plates 12 and 14 can slide along rods 16 and 18. Plates 12 and 14 have apertures 28 and 30 for receiving pins or rods from a head rest on top of a vehicle seat to which seat belt adjuster 10 can be mounted. Rods 16 and 18 are connected to the seat belt buckle guard 32 having a triangular solid plate 34 that is molded to or with a rectangular brace 36. The buckle guard 32 has a rectangular opening 38 sized for catching a seat belt buckle. The buckle guard 32 extends outward perpendicularly from triangular solid plate 34. The rectangular brace 36 of buckle guard 32 further includes a slit 40 so that the belt (not shown) of the seat belt can be slid through into rectangular brace 36.

Figure 2:
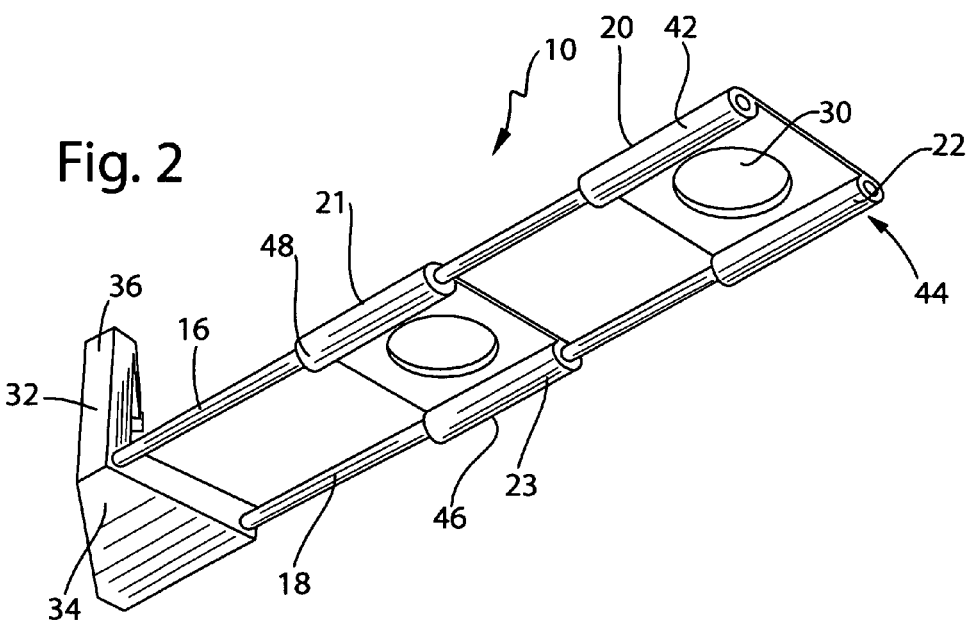
FIG. 2 is a bottom perspective view of the flexible seat belt adjuster in accordance with the invention.

FIG. 2 depicts a bottom perspective view of the flexible seat belt adjuster 10 in which at least one of cylindrical-shaped sides 20, 21, 22 or 23 of plates 12, 14 includes a hole for receiving a screw 42 that can engage with one of rods 16, 18 so that plates 12 and 14 can be secured in place. The seat belt adjuster 10 preferably has both cylindrical-shaped sides 20, 22 of plate 14 having holes for receiving screws 42, 44 that are engageable with rods 16, 18 so plate 14 can be secured in place on rods 16, 18. Most preferably, plate 12 similarly has hole and screw combinations 46, 48 such that both plates 12, 14 can be secured in place to rods 16, 18. In this way, plates 12, 14 can be moved to affix to any sized head rest of a vehicle as opposed to that of just one particular vehicle model, thereby enhancing the versatility of the flexible seat belt adjuster 10 of the present invention.

Figure 3:
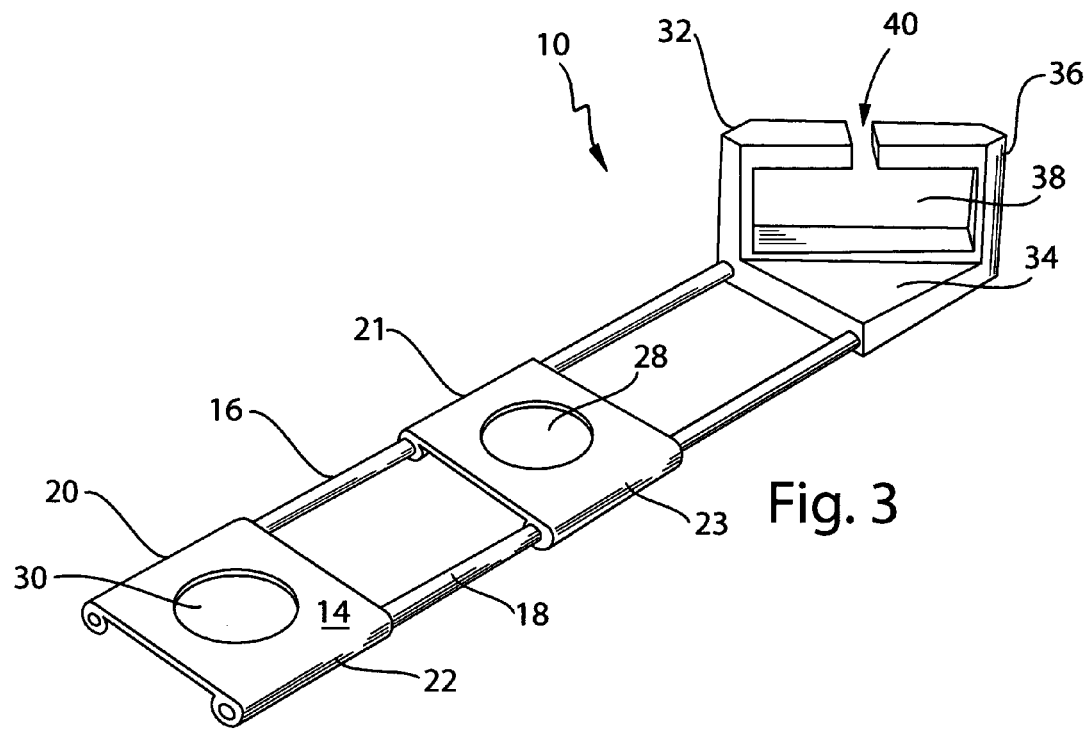
FIG. 3 is another top perspective view of the flexible seat belt adjuster from another angle which illustrates the seat belt buckle guard's shape and design.
Figure 4:
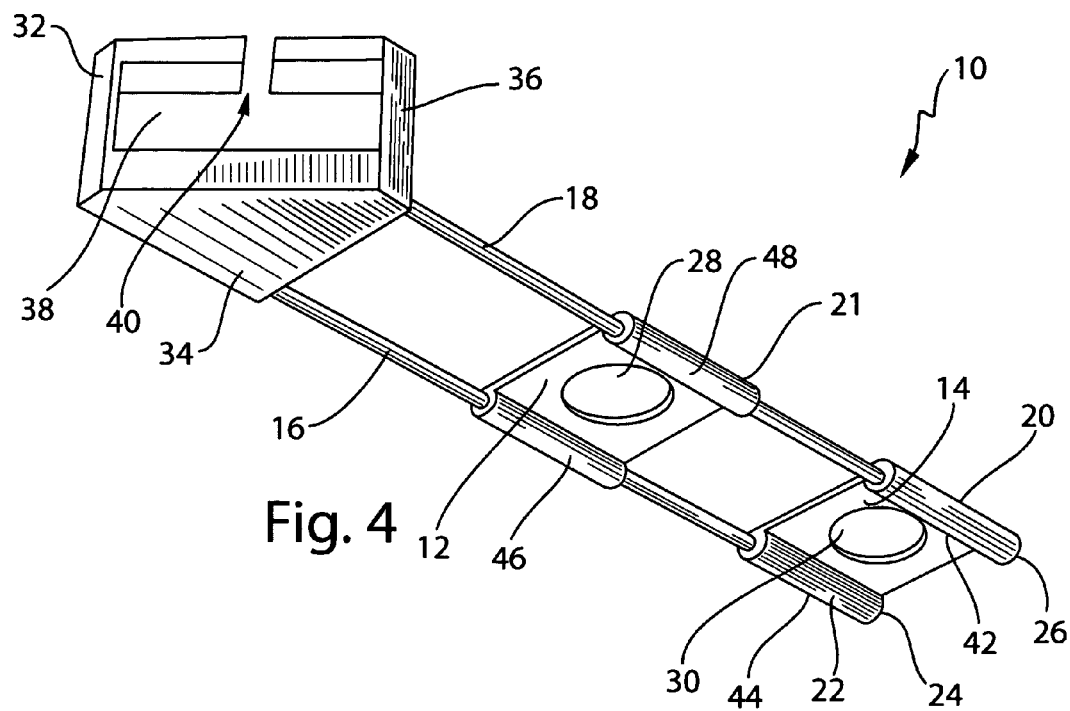
FIG. 4 is another bottom perspective view of the flexible seat belt adjuster which illustrates the seat belt buckle guard's shape and design.

FIGS. 3 and 4 illustrate perspective views of flexible seat belt adjuster 10, and more clearly, depict rectangular opening 38 for catching the buckle of a seat belt assembly on a vehicle. It should be understood that rectangular opening 38 may be modified to any desired shape so long as it achieves the purpose of catching or restraining buckles on car seat belts. As mentioned earlier, slit 40 allows the belt portion to slide into rectangular opening 38. In practice, a head rest on a vehicle seat would be removed, and its studs, rods, pins or similar-shaped apparatuses slid into apertures 28, 30 on plates 12, 14. If, however, the head rest studs do not fit through apertures 28, 30, then plates 12, 14 can be slid along rods 16, 18 until they do. Screws 42, 44 are loosened and tightened as needed when plates 12, 14 need adjustment to receive a particular vehicle's head rest studs. Preferably, flexible seat belt adjuster 10 also includes screws 46, 48 for enhanced flexibility and ease of adjustment to a vehicle's heat rest studs design. Screws, 42, 44, 46, 48 can be pins, plastic, steel or otherwise, that can provide the necessary engagement and disengagement with rods 16, 18. Those skilled in the art will appreciate the wide variety of mechanical devices that could be substituted for the screws 42, 44, 46, 48 and holes design depicted herein.

The flexible seat belt adjuster 10 can include rods 16, 18 that are made from steel, and plates 12, 14 that are made from plastic. Rectangular brace 32 can also be made from plastic. Alternatively, plates 12, 14, rectangular brace 32 and rods 16, 18 can be made from metal. A wide variety of other materials and combination of materials may be substituted for the various components of flexible seat belt adjuster 10 without departing from the scope of the invention.

Figure 5:
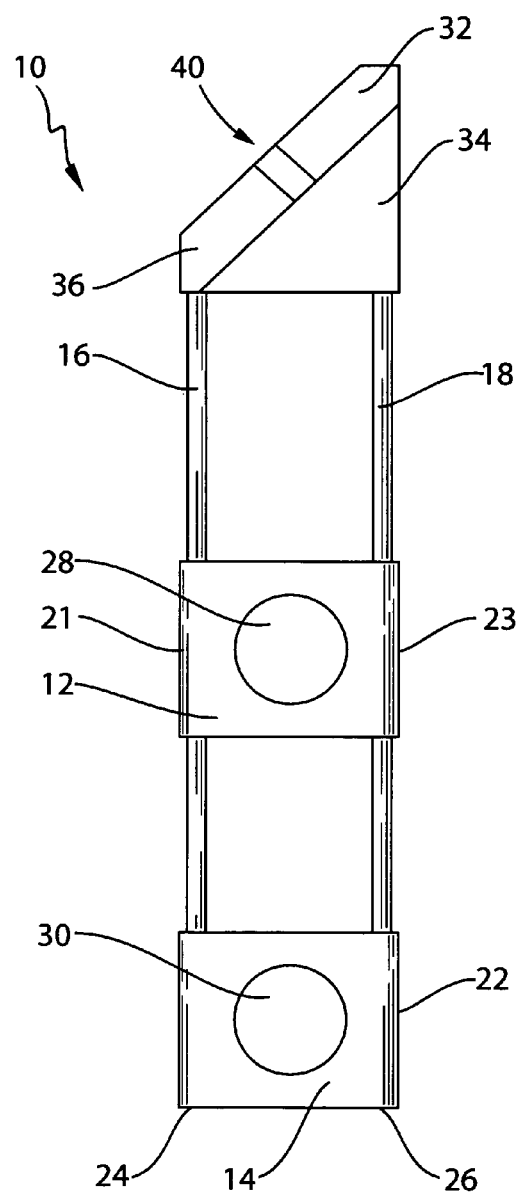
FIG. 5 is a top view of the flexible seat belt adjuster in accordance of the invention.
Figure 6:
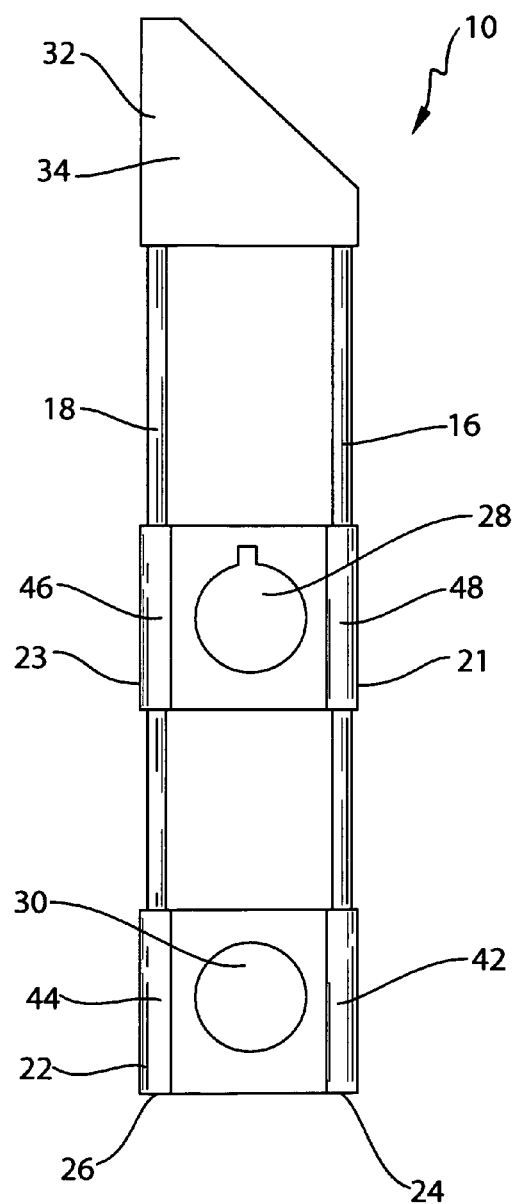
FIG. 6 is a bottom view of the flexible seat belt adjuster in accordance of the invention.

FIG. 5 illustrates a top view while FIG. 6 illustrates a bottom view of the flexible seat belt adjuster 10 of the invention. FIG. 5 shows the smooth top of the flexible seat belt adjuster 10 that would be seen once affixed to the seat of a vehicle. Of course, the head rest would block views of apertures 28, 30 as head rest studs would be inserted into them. FIG. 6 clearly shows hole and screws 42, 44, 46, 48 for adjusting plates 12, 14 to fit whichever vehicle head rest stud design is on the user's vehicle. The aesthetics of the flexible seat belt adjuster may be modified as desired, for example, all or parts may be in different colors or have decorative stickers to enhance salability.

What is claimed is:

1. A seat belt adjuster comprising:
   two parallel rods each having first and second ends; said rods are connected at said first ends by a seat belt buckle guard for catching a seat belt buckle;
   two plates each having at least two parallel cylindrical-shaped sides with holes through which said parallel rods can be inserted such that said plates can slide between said first and second ends of said rods; said plates further include apertures through which pins from a head rest can be inserted such that said seat belt adjuster can rest on a vehicle seat and receive a seat belt having said seat belt buckle.

2. The seat belt adjuster of claim 1 wherein said buckle guard has a triangular solid plate connecting said rods with a rectangular brace having a rectangular opening sized for catching said seat belt buckle and which is angled and extends perpendicular outward from said solid plate.

3. The seat belt adjuster of claim 2 wherein said rectangular brace of said buckle guard further includes a slit so that the belt of said seat belt can be slid through into said rectangular brace.

4. The seat belt adjuster of claim 1 wherein at least one of said cylindrical-shaped sides of said plates includes a hole for receiving a screw that can engage with one of said rods so that said plates can be secured in place.

5. The seat belt adjuster of claim 4 wherein both cylindrical-shaped sides of said plates has a hole for receiving said screw engageable with said rods so said plates can be secured in place on said rods.

6. The seat belt adjuster of claim 1 wherein at least one of said cylindrical-shaped sides of said plates includes a hole for receiving a pin that can engage with one of said rods which also includes an opening for receiving said pin so that said plates can be secured in place.

7. The seat belt adjuster of claim 6 wherein both cylindrical-shaped sides of said plates has a hole for receiving said pin engageable with said rods so said plates can be secured in place on said rods.

8. The seat belt adjuster of claim 1 wherein said rods are made from steel and said plates are made from plastic.

9. The seat belt adjuster of claim 2 wherein said solid plate, said rectangular brace and said plates are made from a plastic and said rods are made from steel.

10. The seat belt adjuster of claim 2 wherein said solid plate, said rectangular brace and said plates and said rods are made from metal.

* * * * *